Jan. 2, 1951  H. M. SCHLEICHER  2,536,099
MEANS FOR FORMING STAGES IN FLUIDIZED MASSES
Filed Aug. 18, 1947  2 Sheets-Sheet 1
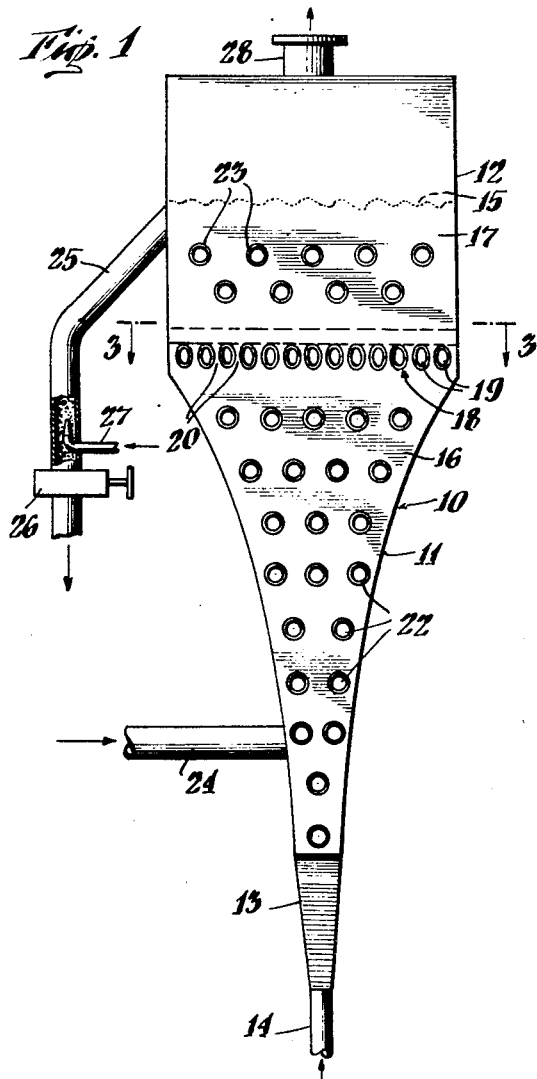
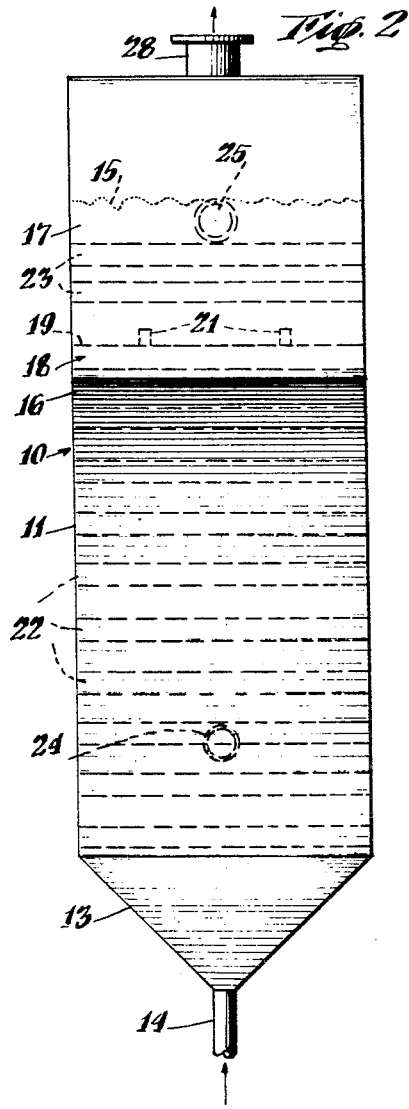
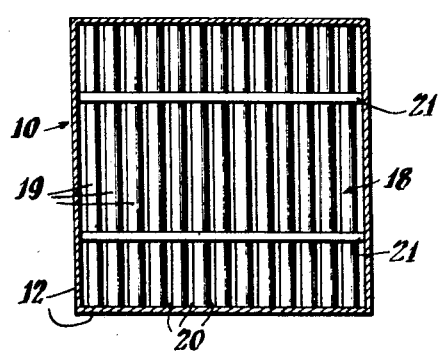
INVENTOR.
Henry M. Schleicher
BY Paul W. Garbo
AGENT

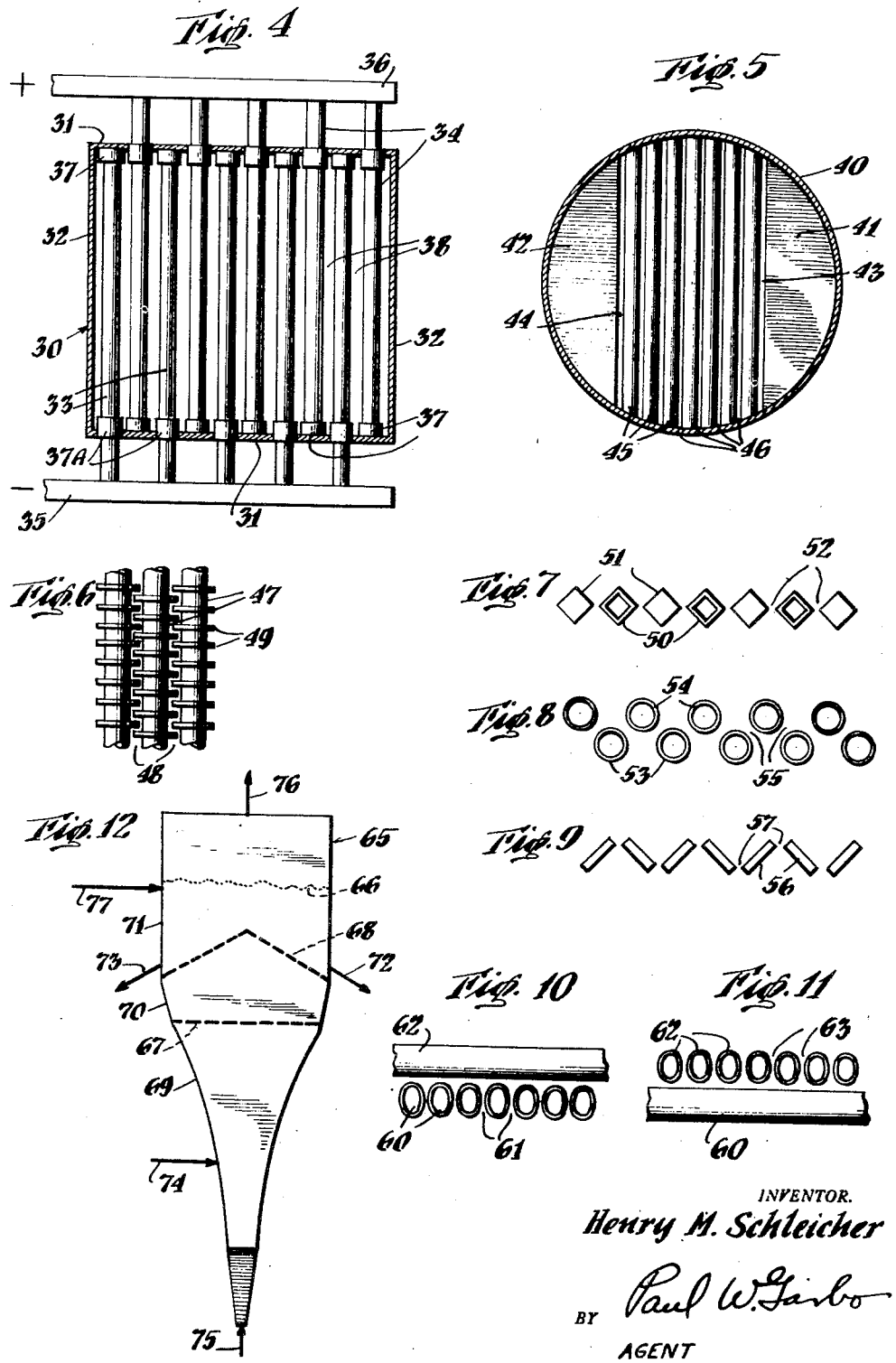

Patented Jan. 2, 1951

2,536,099

UNITED STATES PATENT OFFICE 2,536,099

MEANS FOR FORMING STAGES IN FLUIDIZED MASSES

Henry M. Schleicher, Elizabeth, N. J., assignor to The American Metal Company, Limited, New York, N. Y., a corporation of New York Application August 18, 1947, Serial No. 769,229

3 Claims. (Cl. 266—24)

This invention relates to apparatus for contacting comminuted solids with gasiform media under fluidizing conditions, and more particularly to such apparatus wherein the fluidized mass is divided into two or more contiguous and communicating zones or stages so that the solids and gasiform media pass through the series of zones or stages.

With the increasing number of applications of the fluidizing technique to chemical and metallurgical processes, recourse to stage-wise operation has been found advantageous in several cases. Proposals to achieve staging or zoning of the fluidized mass have included perforated plates, small-mesh screens and funnel-shaped partitions disposed horizontally through the fluidized mass. Alternatively, it has been suggested that staged fluidizing processes be conducted in two or more reaction vessels arranged in series. The means suggested for dividing the fluidized mass of a single vessel into contiguous stages have not been entirely satisfactory and the use of a plurality of vessels in series has been found too costly for commercial practice.

In addition to the problems of dividing a fluidized operation into stages there is frequently the important consideration of providing adequate heat transfer means to maintain the fluidized mass at the desired reaction temperature.

A principal object of my invention is to provide simple means for dividing the fluidized mass in a vessel into a series of stages through which the solids and gases pass in succession.

Another important object is to employ elements in the fluidizing chamber which function in the dual capacity of forming stages within the fluidized bed and of effecting desired heat transfer.

A further object is to make fluidizing vessels, in which the staging of the fluidized contents and the transfer of heat are required, more compact; consequently, such vessels are made more efficient in operation, particularly from the thermal viewpoint.

Additional objects of my invention will become evident from the following description.

The invention involves the use of a plurality of elements in closely spaced relation to act both as a grid or grill for dividing a fluidized mass into communicating stages and as the means for effecting desired heat transfer. Desirably, the elements are elongate and simple in transverse section, such as circular, oval or square. Ordinary pipes and tubes are well suited for the purposes of this invention.

As known to those skilled in the fluidizing technique, the size of the openings in any grid or equivalent means used to separate a fluidized bed into contiguous zones through which the comminuted solids and gases can pass in succession depends on several factors including the particle size, shape and density of the solids, the velocity, viscosity and density of the gases and the desired rate of flow of solids from one stage to another. The optimum opening size in any case is determinable by preliminary tests conducted under conditions simulating those of the projected operation. However, as a general rule, I find it advisable to space the grill elements so that the width of the spaces or openings therebetween at their narrowest portion is about $1/20$ to $1/2$, preferably about $1/10$ to $1/4$, of the effective horizontal width of the elements. Thus, for instance, a grill made up of parallel pipes $3\frac{1}{2}$ inches in outside diameter arranged in a horizontal plane with $1/2$-inch clearances between adjacent pipes is satisfactory for maintaining superimposed stages within a fluidized mass of roasted zinc ore and coke undergoing reduction at a temperature of about 1800° F., the particle size of the solids being smaller than 60 mesh and the velocity of the gases prior to passage through the grill being about 1 foot per second.

While the effective horizontal width of the element selected in assembling a grid may be varied considerably, this width will usually fall in the range of about $1/2$ to 8 inches, and more frequently in the range of about 1 to 4 inches. It is obvious that the choice of element width will depend in part on the width of the fluidized bed that is to be divided into connecting stages by the grid. Thus, with a bed only 2 feet wide, elements of 1 to 2-inch width would be more practical than elements of 5 or more inches in width.

As hereinabove mentioned, the grid or stage-forming means of my invention also provides heat transfer surface in good heat exchange contact with the fluidized mass. For this purpose, at least some of the grid elements are made to carry heat to or from the fluidized reaction mass as the case may require. In endothermic reactions, the elements may take the form of hollow tubes or pipes through which a heating medium, e. g., combustion gases, is passed. Alternatively, the elements may be electrically heated resistances or electrodes with electrical energy flowing through the fluidized mass to generate heat therein. Where the reaction is exothermic, hollow elements with a circulating cooling medium are effective in removing reaction heat.

For a fuller and clearer understanding of my invention, reference is now made to the accompanying drawings of which;

Figure 1 is an elevation of a two-stage fluidizing reactor;

Figure 2 is a side view of the apparatus shown in Figure 1;

Figure 3 is a section taken along the line 3—3 of Figure 1 to show the grid or stage-forming assembly;

Figure 4 is a plan view of another type of grid;

Figure 5 is a plan view of a modified grid for cylindrical vessels;

Figure 6 is a fragmentary plan view of still another type of grid;

Figures 7, 8 and 9 are transverse sections of various elements arranged in different ways to form grids according to this invention;

Figures 10 and 11 are transverse sections, taken at right angles to each other, of a two-layer grid construction; and Figure 12 is a diagrammatic representation of a three-stage fluidizing vessel.

Referring to Figures 1, 2 and 3, a vessel 10 is provided with a lower flared section 11 and an upper section 12. The bottom of flared section 11 connects with an adapter section 13 which serves to supply a fluidizing gas or vapor introduced through pipe 14 uniformly across the bottom of section 11. In operation, the vessel 10 holds a fluidized mass extending from the bottom thereof to the pseudo-liquid level 15. To achieve stagewise operation, the fluidized mass is divided into superimposed zones or stages 16 and 17 by grid 18. Grid 18 is made up of a plurality of parallel elliptical tubes 19 (major axis vertical) arranged with clearances 20 therebetween to establish communication between stages 16 and 17 of the fluidized bed. Where the tubes 19 are long and tend to vibrate or whip, crossbars 21 may be employed to prevent whipping; the tubes 19 may be fastened to crossbars 21 by spot welding or in any other desired way. While heat transfer is effected by passing a suitable fluid through the grid tubes 19, additional heat transfer surface may be provided in stage 16 by tubes 22 and in stage 17 by tubes 23. Pipe 24 is used to introduce fresh reactant solids into stage 16 and standpipe 25 to withdraw reacted solids from stage 17. Solids may be charged through pipe 24 with the aid of a rotating screw (not shown) or like feeding device. The discharge of solids through pipe 25 is controlled by slide valve 26 above which is positioned a tube 27 for feeding an aerating gas to keep the solids in pipe 25 in a free-flowing condition. The reaction gases which may carry some of the solid particles by entrainment leave the vessel 10 by way of outlet 28.

Figure 4 is a horizontal section through a vessel 30, having end walls 31 and side walls 32, to show the grid construction. The grid is made up of two sets of electrical conducting elements 33 and 34 which are connected to bus-bars 35 and 36, respectively. The ends of elements or electrodes 33 and 34 opposite those making connection with the bus-bars are set in suitable insulators 37. Similarly, insulators 37A surround the electrodes 33 and 34 at the points where these electrodes pass through end walls 31 of vessel 30. The set of electrodes 33 and the set of electrodes 34 are arranged in spaced relation to leave clearances 38 which provide the communicating channels between a fluidized mass below the grid and that above the grid. The bus-bars 35 and 36 are connected to a suitable source of electric power; the electricity in flowing from one set of electrodes to the other must pass through the spaces 38 through which the solids and gases of the fluidized mass flow. The spaces or gaps 38 offer appreciable resistance to the flow of electricity and heat is thereby generated to satisfy at least in part the heat requirements of an endothermic reaction carried out in vessel 30. The electrical grid of Figure 4 is particularly suitable for endothermic reactions wherein the fluidized bed includes particles of carbon, metal or the like.

Figure 5 is a horizontal section of a cylindrical vessel 40 wherein baffle plates 41 and 42 restrict the open cross-section of vessel 40 to the opening bounded by edges 43 and 44 of baffles 41 and 42, respectively. Within this opening a plurality of tubes 45 are disposed in parallel and spaced relation to restrict further the opening to a plurality of spaces 46. The flow of solids and gases between the stage above and that below the grid made up of pipes 45 and baffle plates 41 and 42 is limited to the spaces or clearances 46 between the tubes. A heating or cooling medium is passed through the tubes 45, as the case may require. If the tubes 45 are to supply heat to the contiguous stages, electrical resistance elements may be inserted in these tubes instead of passing a heating medium or fluid therethrough.

Figure 6 is a plan view of a portion of a grid formed by a plurality of tubes 47 with spaces 48 therebetween and fins 49 to improve the transfer of heat between the tubes and the fluidized mass contacting them. The fins on each tube are staggered relative to the fins on adjacent tubes.

Figure 7 is a transverse view of a portion of a grid made up of square tubes 50 and square rods 51 arranged in alternating order with clearances 52 therebetween. The tubes 50 are supplied with any desired heating or cooling medium depending on the nature of reaction in the fluidized mass which is divided by this grid into connecting stages.

In contrast to Figure 7 wherein the grid would provide more surface than is necessary to maintain the fluidized mass at a desired reaction temperature and, accordingly, some of the elements, i. e., rods 51, are divested of their heat transfer role, the grid of Figure 8 packs more heat transfer surface across a fluidized mass than is possible by an in-line arrangement of the grid elements. In this case, a lower set of tubes 53 is spaced from an upper set of tubes 54 so as to form a saw-tooth outline with clearances 55 between the tubes 53 and 54.

Figure 9 depicts a grid formed by elements 56 having a rectangular transverse section. The elements 56 are set obliquely in alternating directions with spaces 57 therebetween so that there is communication between the fluidized mass below the grid and that above it. The elements 56 might be electrical resistance heaters, such as Globars.

The grid of Figures 10 and 11 comprises two banks of oval tubes 60 and 62 disposed at right angles to each other. The tubes 60 have spaces 61 therebetween and tubes 62 have spaces 63 therebetween. The two-layer grid construction shown is particularly advantageous where the fluidized reaction requires an unusual amount of heat transfer surface.

Figure 12 outlines a three-stage fluidizing reactor 65 which is filled with a fluidized mass having an upper pseudo-liquid level 66. The fluidized mass is divided by flat grid 67 and peaked grid 68 into a lowermost flared stage 69, an intermediate tapered stage 70 and an uppermost straight section 71. The peaked transverse outline of grid 68 is particularly advantageous where the reaction solids tend to agglomerate within stage 71 of the fluidized reactor. Where agglomerates are formed, they will gravitate along the sloping surfaces of grid 68 and be withdrawn at the lowest points of the grid as at 72 and 73. Grids 67 and 68, like the other grids hereinbefore described, comprise a plurality of elongate elements arranged in parallel and spaced relation and adapted to transfer heat to or from the fluidized mass contacting them. Fresh reactant solids may be introduced into zone 69 by way of line 74 and a fluidizing gas or vapor may be introduced by way of line 75. The reaction gases leave vessel 65 through outlet 76. Where desired, a line 77 may be provided for the introduction of a solid reactant into zone 71. For instance, powdered coke may be added by way of line 77, when the reactor 65 is used to reduce zinc oxide, in order to curtail the carbon dioxide content of the gaseous effluent having through outlet 76. As known, carbon dioxide is undesirable because it tends to reoxidize the zinc vapor present in the gaseous effluent.

The staged fluidizing reactors of my invention find application in diverse process industries. The non-ferrous metallurgical industry with which I am best acquainted offers several opportunities for employing the apparatus of my invention. For instance, the roasting of zinc sulfide ores may be conducted in a fluidizing reactor of two or more stages in which the grid or grids constructed in accordance with my invention are supplied with a cooling medium to remove excess heat from the reacting mass. The resulting zinc oxide product may also be reduced with a solid reducing agent such as coke under fluidizing conditions in a two-stage reactor of the type shown in Figures 1, 2 and 3 or a three-stage reactor of the type indicated in Figure 12, the grid elements employed in these reactors furnishing at least part of the heat requirements for effecting the reduction of the zinc oxide. The apparatus of my invention is particularly well suited for the stagewise fluidizing reduction of zinc compounds such as zinc oxide and zinc silicate as disclosed in the copending application Serial No. 767,548 of John C. Kalbach, filed August 8, 1947. Said application reveals the advantages accruing from the reduction of a zinc compound like zinc oxide in a plurality of fluidized stages rather than in a single fluidized body and further points out the desirability of having at least the lowermost fluidized stage assume a form in which the horizontal cross-section increases in the upward direction.

While the references made throughout the present application to stages or zones of a fluidized mass are well understood by those skilled in the art, it may be well to state that such staging or zoning of a fluidized mass has the effect of establishing a different average composition for the solids in the several stages or zones maintained within the fluidized mass. Accordingly, grids and equivalent devices function to resist the natural tendency of a fluidized mass, which is to have the solids of the same average composition throughout the mass, by forming stages or zones wherein the solids have average compositions differing from one another. For example, in a two-stage reduction of zinc oxide by the fluidizing process of the aforesaid copending application, the solids in the first stage may have an average content of about 11% by weight of zinc while the corresponding figure for the second stage may be only about 1%.

The foregoing description and examples are intended to be illustrative only. The several modifications of my invention which will be apparent to those skilled in the art and which conform to the spirit of the invention are to be considered within the scope of the claims.

What I claim is:

1. An improved reactor for effecting the stagewise reduction of finely divided zinc oxide under fluidizing conditions at an elevated temperature above the boiling temperature of zinc, which comprises two spaced, flat, vertical walls and two spaced, nonplanar, upright walls, said four walls forming a tall vessel having a substantially rectangular, horizontal cross-section which increases in area in the upward direction through said vessel, an inlet duct connected to the bottom of said vessel, an outlet duct connected to the top of said vessel, a plurality of widely spaced heating tubes and a plurality of closely spaced heating tubes, all of said tubes passing horizontally through said vessel and said two flat walls and being connected to said two flat walls, said plurality of closely spaced heating tubes forming a substantially horizontal grid across said vessel to provide superimposed reduction stages in said vessel and the spaces between said closely spaced heating tubes forming said grid being from about 1/20 to ½ of the horizontal width of said closely spaced tubes.

2. The reactor of claim 1 wherein the two spaced, nonplanar, upright walls are symmetrically curved toward the center of said reactor.

3. The reactor of claim 1 wherein the two spaced, nonplanar, upright walls are symmetrically curved toward the center of said reactor below the level of the grid therein and are substantially flat and vertical above said grid level.

HENRY M. SCHLEICHER.

REFERENCES CITED

The following references are of record in the file of this patent:

UNITED STATES PATENTS

| Number | Name | Date |
| --- | --- | --- |
| 1,533,511 | Nemetz | Apr. 14, 1925 |
| 1,553,944 | Laughlin | Sept. 15, 1925 |
| 1,799,858 | Miller | Apr. 7, 1931 |
| 1,868,512 | Ahlmann | July 26, 1932 |
| 1,949,427 | McComb | Mar. 6, 1934 |
| 2,311,984 | Guild | Feb. 23, 1943 |
| 2,352,738 | Ruthruff | July 4, 1944 |
| 2,397,352 | Hemminger | Mar. 26, 1946 |
| 2,398,443 | Munday | Apr. 16, 1946 |
| 2,404,944 | Brassert | July 30, 1946 |
| 2,433,798 | Voorhees | Dec. 30, 1947 |
| 2,446,925 | Hemminger | Aug. 10, 1948 |

FOREIGN PATENTS

| Number | Country | Date |
| --- | --- | --- |
| 246,806 | Great Britain | June 17, 1926 |
| 381,184 | Great Britain | Sept. 26, 1932 |